(12) United States Patent
Charny et al.

(10) Patent No.: US 7,567,508 B2
(45) Date of Patent: Jul. 28, 2009

(54) METHOD AND SYSTEM FOR PROVIDING DELAY BOUND AND PRIORTIZED PACKET DROPPING

(75) Inventors: Anna Charny, Sudbury, MA (US); Christopher Kappler, Waltham, MA (US); Sandeep Bajaj, Fremont, CA (US); Earl T. Cohen, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 652 days.

(21) Appl. No.: 11/134,898

(22) Filed: May 23, 2005

(65) Prior Publication Data

US 2006/0262720 A1 Nov. 23, 2006

(51) Int. Cl.
*H04L 12/26* (2006.01)
*H04L 12/56* (2006.01)
*G06F 15/173* (2006.01)
*G06F 5/00* (2006.01)

(52) U.S. Cl. .......... 370/229; 370/413; 370/415; 370/417; 709/224; 709/225; 709/226; 710/53; 710/54; 710/55; 710/56; 710/57

(58) Field of Classification Search ......... 370/229–237, 370/411–419; 709/223–226; 710/52–57
See application file for complete search history.

(56) References Cited

U.S. PATENT DOCUMENTS

| | | | | |
|---|---|---|---|---|
| 5,564,062 A | * | 10/1996 | Meaney et al. | 710/244 |
| 5,604,742 A | * | 2/1997 | Colmant et al. | 370/396 |
| 6,061,330 A | * | 5/2000 | Johansson | 370/229 |
| 6,496,811 B1 | * | 12/2002 | Bodnar | 706/3 |
| 6,885,638 B2 | * | 4/2005 | Xu et al. | 370/230 |
| 6,941,308 B1 | * | 9/2005 | Chilton | 707/100 |
| 6,944,678 B2 | * | 9/2005 | Lu et al. | 709/245 |
| 6,996,117 B2 | * | 2/2006 | Lee et al. | 370/429 |
| 7,075,927 B2 | * | 7/2006 | Mo et al. | 370/389 |
| 7,177,274 B2 | * | 2/2007 | Van Der Zee et al. | 370/230 |

(Continued)

FOREIGN PATENT DOCUMENTS

WO   WO 00/60817   10/2000

(Continued)

OTHER PUBLICATIONS

F. Baker et al., "Implementing MLPP for Voice and Video in the Internet Protocol Suite", IETF Internet Draft, Feb. 15, 2004.

(Continued)

*Primary Examiner*—Daniel J Ryman
*Assistant Examiner*—Nishant B Divecha
(74) *Attorney, Agent, or Firm*—Cindy Kaplan

(57) ABSTRACT

A method and system for providing delay bound and prioritized packet dropping are disclosed. The system limits the size of a queue configured to deliver packets in FIFO order by a threshold based on a specified delay bound. Received packets are queued if the threshold is not exceeded. If the threshold is exceeded, a packet having a precedence level less than that of the precedence level of the received packet is dropped. If all packets in the queue have a precedence level greater than that of the packet received, then the received packet is dropped if the threshold is exceeded.

33 Claims, 5 Drawing Sheets

U.S. PATENT DOCUMENTS

| | | | |
|---|---|---|---|
| 2003/0235202 | A1 | 12/2003 | Van Der Zee et al. |
| 2004/0093423 | A1* | 5/2004 | Kaniyur et al. ............. 709/229 |
| 2004/0179473 | A1* | 9/2004 | Thibodeau et al. .......... 370/232 |
| 2004/0257991 | A1* | 12/2004 | Sterne et al. ................ 370/230 |

FOREIGN PATENT DOCUMENTS

| | | |
|---|---|---|
| WO | WO 01/86913 | 11/2001 |

OTHER PUBLICATIONS

F. Baker et al., "MLEF Without Capacity Admission Does Not Satisfy MLPP Requirements", IETF Internet Draft, Feb. 15, 2004.

A. Charny et al., "Supplemental Information for the New Definition of the EF PHB (Expedited Forward Per-Hop Behavior", RFC 3247, Internet Engineering Task Force, Mar. 2002.

B. Davie et al., "An Expedited Forwarding PHB (per-Hop Behavior)", RFC 3246, Internet Engineering Task Force, Mar. 2002.

J. Heinanen et al., "A Two Rate Three Color Marker", RFC 2698, Internet Engineering Task Force, Sep. 1999.

J. Heinanen et al., "S Single Rate Three Color Marker", RFC 2697, Internet Engineering Task Force, Sep. 1999.

M. Pierce et al., "Architecture for Assured Service Capabilities in Voice over IP", IETF Internet Draft, Jun. 23, 2003.

* cited by examiner

METHOD AND SYSTEM FOR PROVIDING DELAY BOUND AND PRIORTIZED PACKET DROPPING

BACKGROUND OF THE INVENTION

The present invention relates generally to data networking and, more specifically, to providing delay bound and prioritized packet dropping for MLPP (Multilevel Precedence and Preemption) applications.

The Defense Information Systems Agency (DISA) of the United States Department of Defense, with its contractors, has proposed a service architecture for military (NATO and related agencies) telephone systems. It is called Assured Service, and is defined in two documents: Pierce, et al. "Architecture for Assured Service Capabilities in Voice over IP", Internet Draft, Internet Engineering Task Force, Jun. 2003, and Pierce, et al. "Requirements for Assured Service Capabilities in Voice over IP", Internet Draft, Internet Engineering Task Force, Jun. 2003. The Assured Service environment provides voice calls with different levels of precedence. In the event of traffic congestion, mission critical calls will be unaffected while calls of lower level precedence may experience reduced quality.

In overview, the requirement is to support calls of multiple precedence levels. In the absence of congestion, all calls have the same QoS requirements, typically expressed in terms of a bound on queuing delay. However, in the case of contention, when it becomes impossible to satisfy the delay bound for all packets, the requirement is to drop packets of lower preemption (precedence) calls before packets of higher preemption. All the packets which are not dropped must satisfy the specified delay bound for their precedence level.

Several datapath mechanisms have been proposed to satisfy these requirements. One such method is known as MLEF PHB (Multi-Level Expedited Forwarding Per Hop Behavior). The conceptual idea of MLEF PHB is to use a priority queue supplemented with preferential dropping mechanisms (via thresholds, policers, or other suitable mechanisms). The different thresholds intend to facilitate dropping lower precedence packets before the higher precedence packets. One difficulty with MLEF is finding a suitable trade-off between sufficient threshold spacing across all levels to ensure appropriate differentiation across precedence levels (irrespective of packet arrival order) and short enough overall queue size to ensure sufficiently tight delay and jitter bounds. Tuning the thresholds is a daunting task with no clear guidance available at this point.

Another approach is to utilize coupled policers (CP), which build upon the simple token bucket policer by allowing tokens to be shared among different token buckets. However, if multiple classes draw tokens from a common bucket, the resulting behavior depends on the arrival order and may introduce undesirable delays.

A drawback with all of the data-path mechanisms described above is that in the case of congestion, while these methods discriminate among precedence levels with respect to dropping packets, they do not discriminate among calls of the same precedence level. This issue is described in Baker, et al., "MLEF Without Capacity Admission Does Not Satisfy MLPP Requirements," Internet Draft, Internet Engineering Task Force, February 2004. Baker et al. describe how Call Admission Control (CAC) procedures are also necessary to achieve the desired Assured Service capabilities. In particular, CAC ensures that, during contention within one level of priority, the system does not end up degrading the quality of service of all the calls at that priority so that no effective communication can actually happen at that priority. Rather, in case of contention, CAC can reject the excessive calls which are beyond the current system capacity to make sure that all the calls within the system capacity experience satisfactory quality of service allowing effective communication at that priority.

It has been found that the well-known RSVP protocol can be used to provide such CAC procedures in combination with certain other mechanisms to fully support the Assured Service Capabilities using EF (Expedited Forwarding) PHB (per hop behavior) in the data path. See Baker, et al. "Implementing MLPP for Voice and Video in the Internet Protocol Suite," Internet Draft, Internet Engineering Task Force, February 2004. The CAC procedures operated by the control plane avoid contention by data packets under normal (non-transient conditions). Some loss could potentially occur, however, in some special circumstances such as due to routing transients or to variable rate beat frequencies. In particular, CAC cannot deal with transient congestion resulting from below-peak rate reservations, or from transient state resulting from network failures, which are frequent occurrences in typical DISA environments. Thus, even in the presence of CAC, an additional mechanism is desired to address transient congestion.

There is, therefore, a need for a method and system that can be used to meet delay bound and prioritized dropping requirements in environments where CAC is not used or in combination with CAC if strict QoS requirements need to be adhered to under transient conditions.

SUMMARY OF THE INVENTION

A method for providing delay bound and prioritized packet dropping includes limiting the size of a queue configured to deliver packets in FIFO order by a threshold based on a specified delay bound. Received packets are queued if the threshold is not exceeded. If the threshold is exceeded, a packet having a precedence level less than that of the precedence level of the received packet is dropped from the queue. If all packets in the queue have a precedence level greater than that of the packet received, the received packet is dropped.

A computer program product for providing delay bound and prioritized packet dropping generally comprises: code that causes the size of a queue configured to deliver packets in FIFO order to be limited by a threshold based on a specified delay bound; code that causes a received packet having a precedence level to be queued if the threshold is not exceeded; code that causes a packet having a precedence level less than that of the precedence level of the received packet to be dropped if the threshold is exceeded or the received packet to be dropped if all packets in the queue have a precedence level greater than that of the received packet and the threshold is exceeded; and a computer-readable medium that stores the codes.

An apparatus for providing delay bound and prioritized packet dropping generally comprises: means for providing a queue configured to deliver packets in FIFO order; means for limiting the size of the queue by a threshold based on a specified delay bound; means for receiving a packet having a precedence level; and means for queuing the received packet if the threshold is not exceeded. The apparatus further includes means for dropping a packet from the queue having a precedence level lower than the precedence level of the received packet if the threshold is exceeded or means for dropping the received packet if all packets in the queue have a higher precedence level than the received packet and the threshold is exceeded.

Further understanding of the nature and advantages of the inventions herein may be realized by reference to the remaining portions of the specification and the attached drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

The present invention is described herein with reference to a representative application but is not limited to this application. In the representative application, calls such as voice or video calls are carried across a packet network such as an IP network. Calls are assigned various precedence levels. When a router of the network encounters congestion packets are discarded based on their assigned precedence levels.

Figure 1:
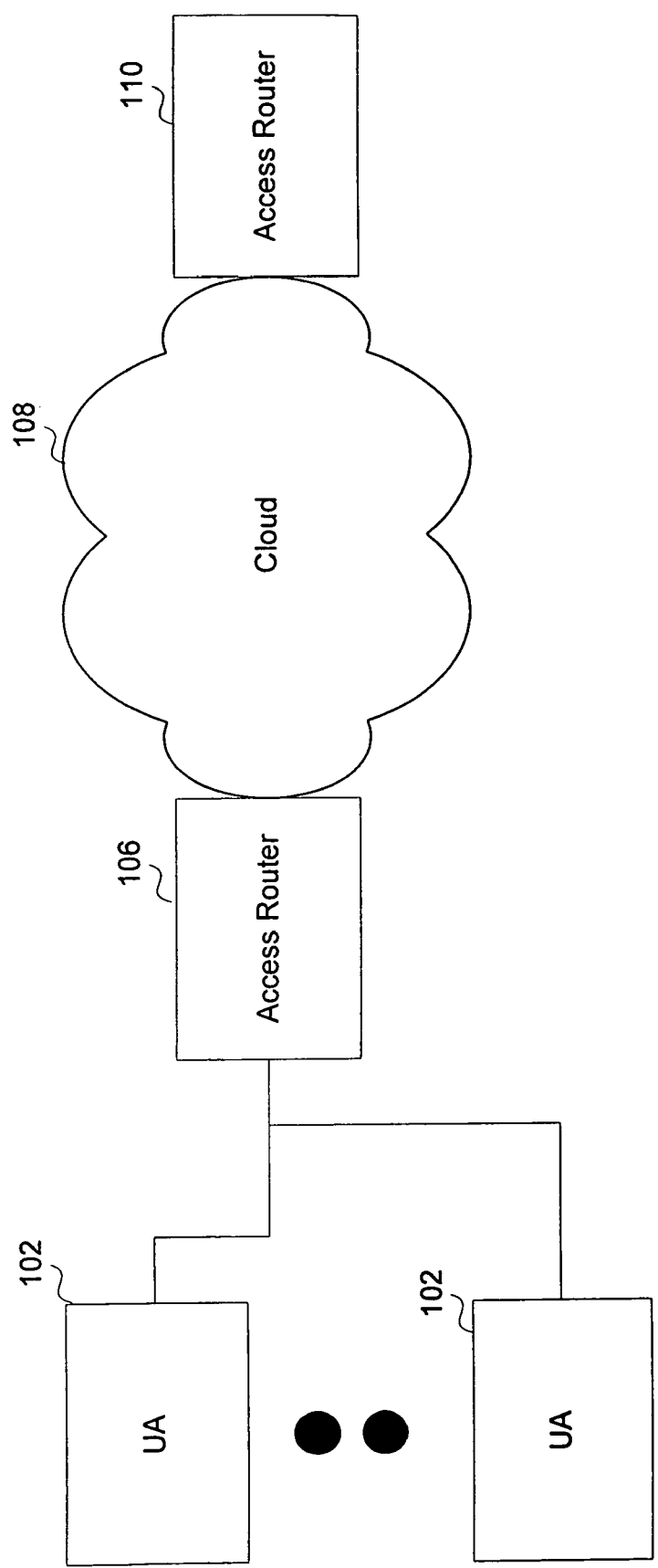
FIG. 1 depicts a network architecture to which embodiments of the present invention may be applied.

FIG. 1 depicts elements of such a network 100. Packets are originated or terminated by various user agents 102 which are devices such as telephones, video phones, computers, etc. Data traffic flows through an access router 106 into a network cloud 108 that includes further routers (not shown). On the other side of the cloud there is another access router 110, other user agents (not shown) and a proxy (also not shown).

Embodiments of the present invention provide a system (data-path mechanism) that operates to keep or drop packets in the desired fashion and satisfy a specified delay bound for packets which are not dropped. In particular, the system delivers a strict delay bound to all precedence levels and provides packet dropping in the strict order of precedence. In addition, the system does not require explicit knowledge of per-precedence rates. The system may operate in the access router 106 or in any router where congestion could be encountered.

A service rate is available collectively to the traffic under consideration. Call admission procedures may be used to assure that this service rate is not exceeded by the aggregate rate of the traffic. However, there may be congestion where admission control is not used, or where admission control is used but certain transient conditions cause the service rate to be exceeded. To enforce the relative priority in access to bandwidth across precedences, packets from the lower precedence may be dropped to allow higher precedence packets to flow.

The decision to keep or drop a packet depends on the packet precedence level. The precedence level of each packet is determined for each packet and assigned by the user agent 102, possibly in conjunction with an authentication mechanism. The assigned precedence level may be inferred from information in the packet header. As a particular example, the precedence may be conveyed in the Diffserv field of the IP packet header. The system may use DSCP (Differentiated Services Codepoint) based classification with a different DSCP value used for each precedence level, for example.

The system may operate in combination with a CAC mechanism to avoid indiscriminate degradation of all calls at the precedence layer straddling congestion. The addition of a CAC mechanism (e.g., RSVP) resolves the "straddling layer" problem while maintaining strict delay and drop precedence in transient conditions that may occur. The fact that the system does not require explicit knowledge of per-precedence rates is an additional benefit, since this may be difficult to know in transient conditions even in the presence of CAC. As described below, the system may also be configured to resolve the straddling layer problem in environments where CAC is not available.

At a high level, the system performs the following functions:

serve packets in FIFO order (i.e., arrival order) when there is no congestion;

limit the size of the total queue by a threshold computed from a desired delay bound;

queue newly arrived packets as long as the queue threshold is not reached; and when a newly arrived packet exceeds the threshold, drop a lower precedence packet that is already queued, and add the newly arrived packet to the tail of the actual (or emulated) FIFO queue. (If the new packet is of the lowest active precedence, the new packet is dropped).

In order to determine if the threshold is exceeded, either packets or bytes may be tracked. The packet (either new packet or lower precedence packet) may be dropped upon receiving the new packet or on transmission of a packet, as described in detail below.

The following sets forth different implementations for performing these operations. A first embodiment uses a packet FIFO implemented as a doubly-linked list. The remaining embodiments avoid the use of doubly-linked lists and use either a FIFO queue or a FIFO scoreboard. Various implementations of the FIFO scoreboard are described below.

Doubly-Linked List

As noted above, the first embodiment uses a packet FIFO implemented as a doubly-linked list. The size of the queue is limited by the desired delay bound. In addition, per-precedence linked lists are maintained to keep track of virtual per-precedence queues inside the FIFO.

Figure 2:
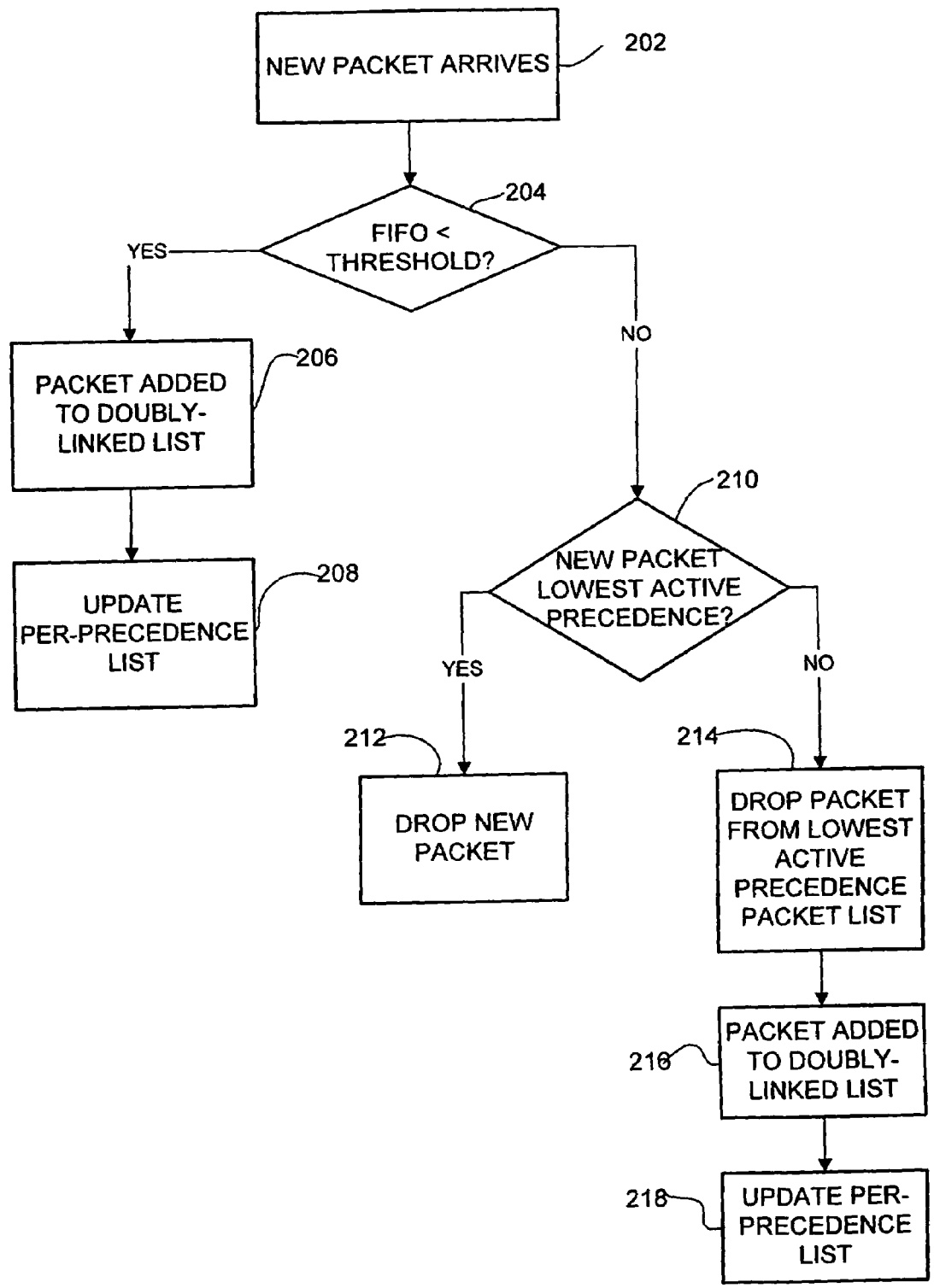
FIG. 2 is a flowchart illustrating a process for providing delay bound and prioritized packet dropping using a FIFO implemented as a doubly-linked list.

FIG. 2 is a flowchart describing steps of handling a received packet. When a new packet of any precedence arrives at step 202, as long as the size of the FIFO is below the threshold, the packet is added to the tail of the doubly-linked list (steps 204 and 206). Also, the corresponding per-precedence list is updated to include the new arrival (step 208).

If the newly arrived packet would cause the queue threshold to be exceeded, the following actions are taken. If it is of the lowest active precedence, the packet is dropped (steps 210 and 212). Otherwise the packet at the head (or tail) of the lowest active precedence packet list is dropped from the FIFO and the newly arrived packet is added to the tail of the FIFO, as well as linked to its corresponding precedence list (steps 214, 216, and 218).

Since the FIFO is implemented as a doubly-linked list, dropping a packet from the middle of the FIFO is an O(1) (order (1)) operation once a packet to be dropped is identified, while maintaining the per-precedence virtual queues make finding the packet to drop an O(1) operation as well. It should be noted that it does not matter exactly which lowest active precedence packet is dropped.

The system thus operates to meet the following objectives:
- a packet is only dropped when otherwise it, or another packet, will be delayed beyond the allowable delay bound;
- no higher precedence packet will be dropped if there is a lower precedence packet in the queue; and
- all packets which are not dropped are guaranteed the delay bound.

In some implementations, doubly-linked lists may not be feasible since they are memory intensive. The double-linked list in the FIFO implementation may be avoided by using an overwrite process. For example, when a higher precedence packet needs to be queued while a lower precedence packet needs to be dropped from the queue, the newly arrived packet can overwrite the packet that is being dropped in the packet FIFO. Such overwriting eliminates the need to "collapse the hole" in the middle of the FIFO that is due to a dropped packet, and hence can be accomplished in the regular FIFO structure (i.e., a regular link list). However, such straightforward overwrite may result in packet reordering among packets of the same precedence, since the lower precedence packet that is being dropped and overwritten by a higher precedence packet may be ahead of other packets of the same (high) precedence in the FIFO. Since the packets at the same precedence level may belong to the same flow, such flow-level packet reordering is undesirable.

The following embodiments avoid the reordering and the doubly-linked list in the FIFO implementation.

FIFO Queue and FIFO Scoreboard

The following provides a comparison of using an equivalence of a FIFO queue and a FIFO scoreboard with per-flow queues. A classic queue of FIFO includes a control component and a data component. The control information is the order in which packets are linked in the queue. The data component consists of the packets themselves. The implementations set forth below each rely on the existence of the following information:
- the arrival order of the packets, which would ideally dictate the departure order; and
- per-precedence and aggregate accounting information of packet and/or byte counts.

FIFO service can be implemented using a single queue, as is typically done. Alternatively, FIFO service can be implemented by allowing arriving packets to enter separate per-precedence queues, and recording a scoreboard or schedule of the order in which those per-precedence queues experienced arrivals. If this arrival schedule is also used at transmit time to determine the order in which the queues are served, then the system will behave like a FIFO.

The principal differences between the two implementations represent the ability to trade off various forms of time and space costs. While one singly linked queue is less expensive in memory cost than N singly linked queues, it is likely that N singly linked queues are less expensive than one doubly linked queue. Likewise, the time cost of possibly dropping low precedence packets from a FIFO in hopes of discovering a high precedence packet behind it may not be acceptable. The implementation choice is preferably made based on the resources available and the statistical performance envelope of the requirements.

Two-Pass Queuing and Per-Precedence Counters

Two-pass queuing and per-precedence counters are best utilized where the traffic to be managed is sufficiently understood. The system comprises:
- an uncommitted arrival queue;
- a committed transmit queue;
- per-precedence packet or byte counters; and
- aggregate packet or byte counters.

As each packet arrives, two sets of counters may be incremented, the aggregate counters and the counters for the precedence level of the arriving packet. The intent is for the majority of queued packets to wait in the uncommitted upstream queue, with only a small number of packets waiting in the committed downstream queue. As such, the committed queue can be considered as a small, constant delay and more or less ignored, though its constant delay must be considered as part of the total expected delay that packets will experience.

Figure 3:
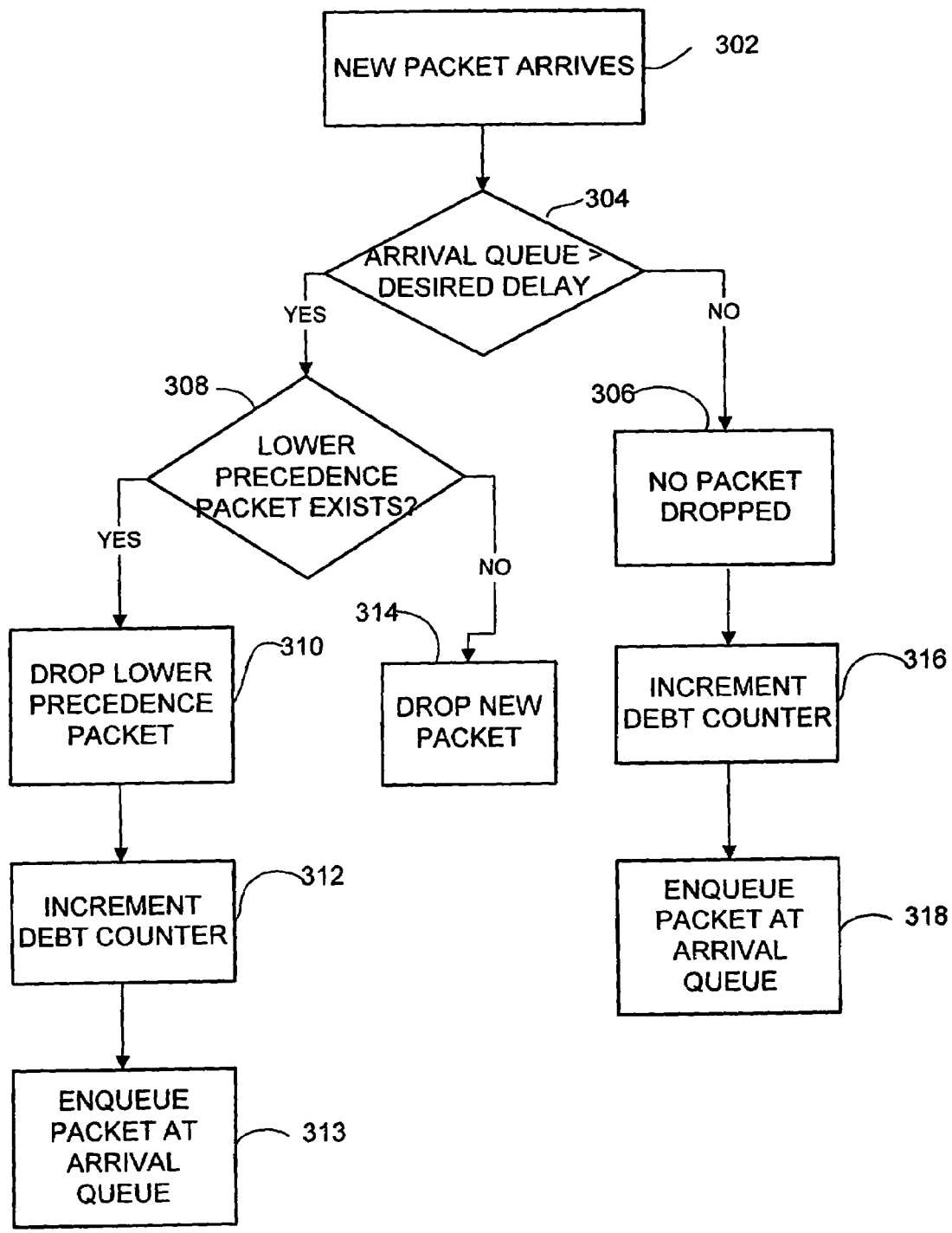
FIG. 3 is a flowchart illustrating a process for providing delay bound and prioritized packet dropping using two-pass queuing and per-precedence counters.

FIG. 3 is a flowchart describing steps of handling a received packet. If the arrival queue is not longer than the desired delay when a new packet arrives at step 302, no packets are dropped (steps 304 and 306). The debt counter for the appropriate precedence level is incremented and the packet is added at the arrival queue (steps 316 and 318). If the arrival queue is longer than the desired delay, either the arriving packet must be dropped without being enqueued, or a lower precedence packet must be dropped. The per-precedence counters are used to determine which is the case. If a lower precedence packet is to be dropped, then a debt counter for the donor precedence level is incremented and the packet is added to the arrival queue (steps 308, 310, 312, and 313). If no such lower precedence packet exists, then the arriving packet must be dropped without being enqueued (step 314).

Periodically, packets are transferred from the uncommitted upstream queue to the committed downstream queue. This transfer is lossy. As each packet is popped from the upstream queue, it may be dropped if the debt counter for its precedence level is non-zero. If the draining of the upstream queue is sufficiently fast, the downstream queue should be able to remain non-empty even with long strings of dropped packets from the head of the upstream queue.

Optimizations to reduce system complexity are possible because of the enqueue processing where all packets are enqueued. All drop decisions can be put off for the point in time that packets are being transferred from the upstream queue to the downstream queue. However, this may slow down the transfer by adding additional processing to each transferred packet and by allowing packets to join the upstream queue that will ultimately be dropped.

The above described embodiment has low complexity and may be implemented on many existing systems. However, the following embodiments provide some preferred performance characteristics in cases where the committed downstream queue actually does under-run.

FIFO Scoreboard and Per-Precedence Queues

Instead of maintaining packets in a single packet FIFO, per-precedence packet queues may be used. For this embodiment, the FIFO service order is enforced by maintaining a FIFO scoreboard (or schedule of the order in which the per-precedence queues experienced arrivals). The schedule may be described as a FIFO of slots, where the slot corresponds to a scheduling opportunity and is assigned to a particular precedence queue. The mechanism of "assigning" a transmit slot to a particular precedence queue may vary. One way to describe it is to assume that the transmit slots contain pointers to (or an ID of) the packet queues of the corresponding precedence level. The length threshold of the FIFO scoreboard is defined by the desired delay bound (just as the packet FIFO threshold was defined by the delay bound in the implementation described above). The implementation of the FIFO scoreboard may vary, and several variations are described below.

Figure 4:
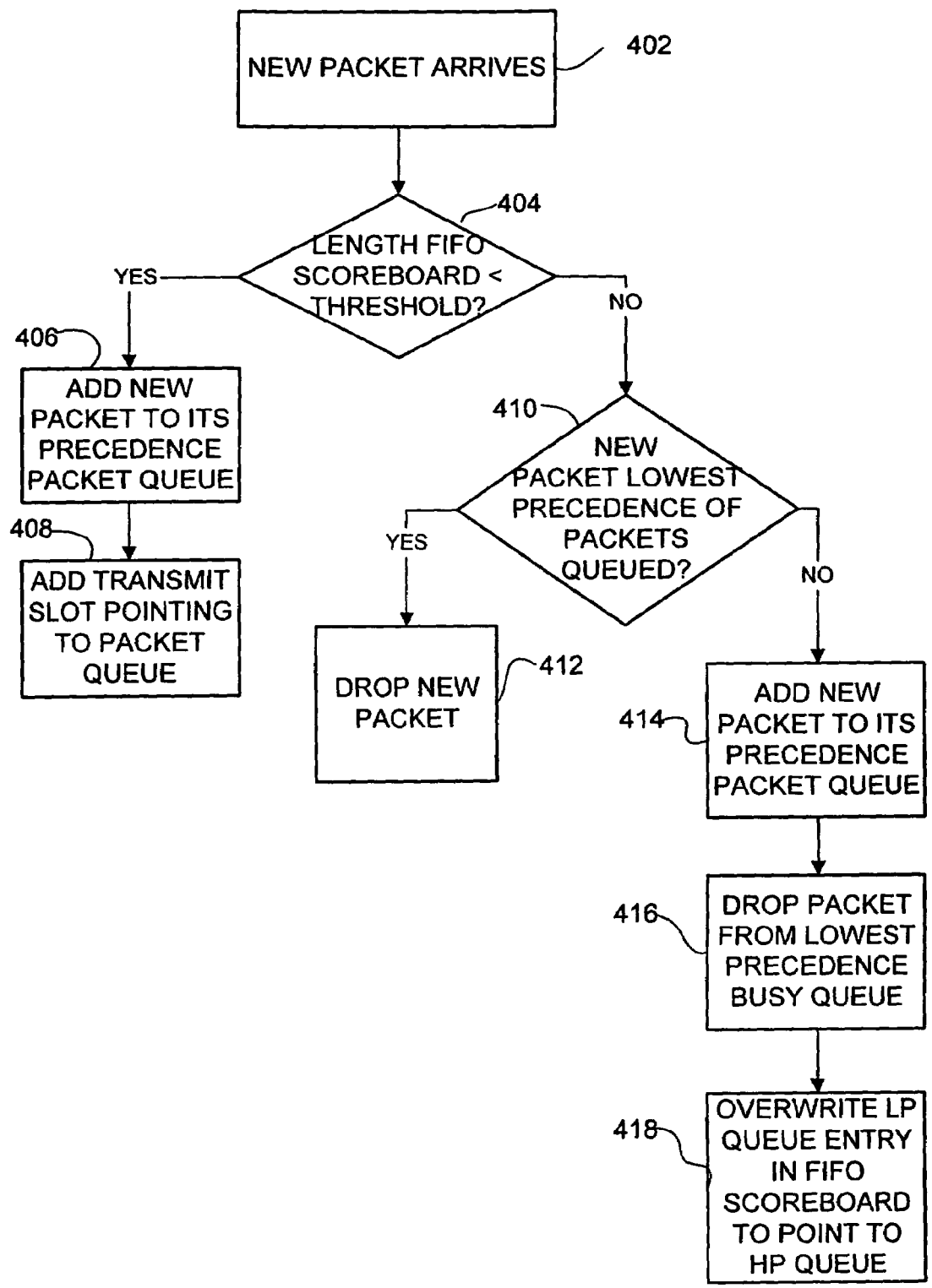
FIG. 4 is a flowchart illustrating a process for providing delay bound and prioritized packet dropping using a FIFO scoreboard and per-precedence queues.

FIG. 4 is a flowchart describing the general steps involved in handling a received packet. When a new packet arrives at step 402, and the length of the FIFO scoreboard is below the threshold (step 404), the packet is added to the tail of its precedence packet queue (step 406), and a transmit slot pointing to this packet queue is added to the end of the schedule (step 408).

When a new packet arrives to an already full schedule, and it is the lowest precedence of all packets already queued, the packet is dropped (steps 410 and 412). If, however, a lower precedence packet than the newly arrived packet is already queued, then:

the newly arrived packet is added to the tail of the packet queue at its precedence (step 414);

a head (or tail) packet from the lowest precedence busy packet queue is dropped (step 416); and an entry in the FIFO scoreboard "belonging" to the lower precedence queue is overwritten to point to the higher precedence queue (step 418). (The transmit slot of a lower precedence is "commandeered" to the higher precedence.)

It should be noted that if the FIFO scoreboard is represented by a simple linked list, then the process of commandeering is an O(1) operation after the slot has been located. However, this does not cause packet reordering within a precedence, because the FIFO scoreboard points to a queue rather than a packet, and so "commandeering of a transmit slot" can be done without causing packet reordering. Nor does this commandeering add delay to any already-arrived packet.

Just as in the case of the implementation described above for doubly-linked list, finding the lower precedence transmit slot in the schedule efficiently requires maintaining additionally a linked list of transmit slots per precedence.

The following describes various implementation approaches to maintain the FIFO scoreboard and to implement "commandeering".

The transmit activity may be represented as slots and tokens in the implementation of the FIFO scoreboard discussed above. Each packet transmit opportunity is referred to as a "slot". The ownership of a particular transmit slot is called the token. As each packet arrives to an un-congested system, two things occur. First, the packet is enqueued in a data queue corresponding to its particular precedence level. Second, that queue is given the token for the next unclaimed transmit slot.

Different ownership paradigms (FIFO service and prioritized commandeering of slots) are described below. In each case the transmit slot holds the queue ID of the queue that owns the slot.

With FIFO service, transmitting a packet is done by reading the FIFO scoreboard, obtaining the ID number of the per-precedence queue that should transmit in that slot, and popping from the head of that queue. Along with this pop operation, the transmit slot that was just consumed is deducted from accounting of slots that the queue owns. As long as no packets are dropped, each packet arrival for any precedence j will advance the tail pointer on the global FIFO scoreboard and will dedicate the corresponding transmit slot to precedence j. Each packet departure will advance the head pointer on the global FIFO scoreboard and will transmit from the queue indicated in the FIFO scoreboard. This arrival and departure process provides FIFO service.

With prioritized commandeering of slots (token transfer), when congestion is detected (that is, when the FIFO scoreboard is larger than the threshold), the arrival process is altered to drop one packet. The dropped packet is from the lowest precedence non-empty queue. If the newly arrived packet belongs to a flow that is lower precedence than any of the other active flows, then that packet is simply dropped. If the newly arrived packet belongs to a flow that is higher precedence than other active per-flow queues, the commandeering process executes to drop a packet other than the newly arrived packet.

As noted above, since slots represent transmit opportunities, and not actual packets, there are no packet ordering issues associated with re-allocation of slots with prioritized commandeering of slots. The slot that is ultimately commandeered from a lower precedence queue may lie between slots that were already allocated for a higher precedence queue. As long as the number of slots in the FIFO scoreboard and the number of packets among all of the queues are identical, the system's assumptions are maintained.

Slot Ownership for FIFO Scoreboard

Slot ownership for the FIFO scoreboard may be implicit or explicit. In the case where slot ownership is implicit, packets are only dropped at arrival time (RX). When a packet is dropped from a lower-precedence queue to make room for a higher-precedence packet, the FIFO scoreboard may remain unmodified, but the lower precedence and higher precedence queues have counters incremented. The lower precedence queue, which experienced the drop, increments the number of transmit slots that it owes to higher-precedence queues. Likewise, the higher precedence queue increments the number of transmit slots that it is owed by lower-precedence queues.

At each transmit opportunity, if the FIFO scoreboard indicates that the slot belongs to a queue that owes transmit slots to other queues, the precedence list is preferably inspected to find the highest precedence queue that is owed a transmit slot. That higher-precedence queue is then served in place of the lower-precedence queue. In addition, both the lower precedence and the higher precedence queues have their token ('owed to' and 'owed by') counters decremented accordingly.

Explicit slot ownership implies a list of the specific slots owned by per-flow queues, and may be maintained in any list structure, but the scanning, insertion and removal costs may vary. As described below, explicit slot ownership may use bit masks, FIFOs, or linked lists.

Since the number of total transmit slots is well known with explicit slot ownership, a bit mask may be used to adhere more tightly to the FIFO intent of the system, and has some advantages over generic linked lists. Though there is no requirement for a donor queue to surrender its earliest slot, a hierarchical bit mask would make it easy for the donor queue to scan for the first slot token that it holds after the head of the global FIFO scoreboard. Clearing this bit, and setting the corresponding bit for the high precedence receiving queue would involve a small number of memory operations amounting to O(1) cost.

In addition, on a packet transmit event, the same mechanism can be used to remove the transmit slot from a queue's ownership list. This is an alternative to the token counts listed above. It provides a more direct transfer of ownership from the donor queue to the receiver queue, and therefore does not give undue latency preference to the highest priority queue.

The following describes explicit slot ownership using FIFOs or linked lists. Unlike bit masks, FIFOs and linked lists imply O(n) or O(log n) cost to insert a value into its sorted position in the middle of the list. The commandeering operation may therefore become too expensive. With each transmitted packet, the list of slots owned by a queue must eliminate the current slot from its list. This is most easily done if the list is sorted by slot ID.

This implies that either the insert operation or the remove operation from the list of owned slots must be able to access the middle of the list. If the list of owned slots were allowed to be unordered, then there would be times when a queue would donate invalid slots to a higher precedence queue. A transmit slot in the middle of the list may be overwritten as an O(1) operation by additionally maintaining linked lists of per-precedence slots, at the cost of maintaining additional state.

The following describes alternative dropping actions. Rather than dropping a packet from the donor lower precedence queue immediately, a drop count may be incremented corresponding to the donor lower precedence queue ID. Then, whenever the next event occurs for the lower precedence queue, one or more packets can be dropped at that time. If the next event for the donor lower precedence queue is a packet arrival, then the arriving packet can be dropped with no update to queuing (and the drop count can be decremented by one). If the next event is a transmit event, and if the current drop count is N, then N+1 packets may be popped from the head of the queue dropping N of them and only transmitting one of them, after which the drop count can be zeroed.

Similarly, assuming the token counter method above, the heads of two queues may be popped at transmit time. One from the donor queue for dropping, and one from the higher-precedence queue for transmit.

In the above approach, the FIFO scoreboard may become idle while some queues are still non-empty and marked for drops. In that event, and depending on the usefulness of the old packets in the low precedence queues, these queues can recycle all of their data immediately, or they can be re-introduced into the FIFO scoreboard.

Resolving Straddling Layer Issue

The following sets forth an implementation designed for resolving the straddling layer problem in the environments where CAC is not available for some reason. The "straddling layer" problem arises when packets of a lower precedence are dropped indiscriminately to the actual calls to which they belong, thus potentially unnecessarily affecting all calls at a given precedence level. A preferred solution is to drop some calls entirely while keeping the rest of the calls at this precedence layer intact.

One way to achieve this without resorting to a CAC is to enhance the framework described above to maintain per-call queues within a given precedence level, effectively adding another layer of hierarchy. The slot in the FIFO scoreboard points to a "precedence group" rather than a precedence FIFO queue, and a per-flow scheduler (e.g. a RR or a WFQ scheduler) is used to choose which queue to serve when the precedence group is scheduled.

When there is a need to drop a packet of a given precedence and commandeer its service slot in the FIFO scoreboard to a higher precedence queue, a low precedence packet is dropped from some queue, and the queue from which this packet is dropped is remembered as a "victim queue". Once a queue has been marked as "victim", whenever a packet needs to be dropped at this precedence, a packet from a victim queue is chosen as long as the victim queue is active. If there are no active victim queues, a new queue is chosen, and is also labeled as victim. It may be desirable to implement some ordering of the victim queues (e.g., a non-empty lower-indexed victim queue is dropped before a higher-indexed one).

If the straddling layer moves to a lower precedence layer, all of the victim markings can be cleared.

Network Device

Figure 5:
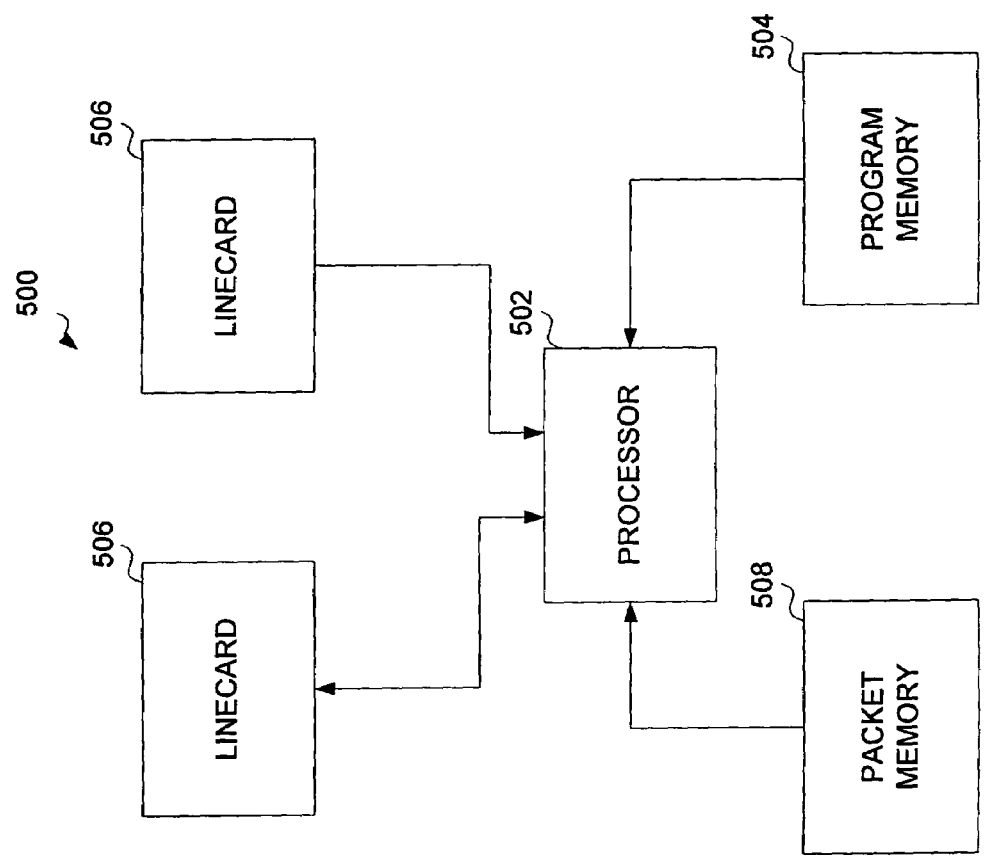
FIG. 5 depicts a network device useful in implementing embodiments of the present invention.

FIG. 5 depicts a network device 500 that may be used to implement any of the network elements of FIG. 1. In one embodiment, network device 500 is a programmable machine that may be implemented in hardware, software, or any combination thereof. A processor 502 executes codes stored in a program memory 504. Program memory 504 is one example of a computer-readable medium. Program memory 504 can be a volatile memory. Another form of computer-readable medium storing the same codes would be some type of non-volatile storage such as floppy disks, CD-ROMs, DVD-ROMs, hard disks, flash memory, etc.

Network device 500 interfaces with physical media via a plurality of linecards 506. Linecards 506 may incorporate Ethernet interfaces, DSL interfaces, Gigabit Ethernet interfaces, 10-Gigabit Ethernet interfaces, SONET interfaces, etc. As packets are received, processed, and forwarded by network device 500, they may be stored in a packet memory 508. To implement functionality according to the present invention, linecards 506 may incorporate processing and memory resources similar to those discussed above in connection with the network device as a whole.

CONCLUSION

As can be observed from the foregoing, the system and method described herein provide many advantages. Strict delay bound and prioritized dropping requirements can be met irrespective of traffic patterns. The various implementation options allow for substantial flexibility.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

What is claimed is:

1. A method for providing delay bound and prioritized packet dropping, the method comprising:
   providing a queue configured to deliver packets in FIFO order;
   limiting the size of said queue by a threshold based on a specified delay bound;
   receiving a packet having a precedence level;
   queuing said received packet if said threshold is not exceeded; and
   if said threshold is exceeded, dropping a packet from said queue having a precedence level less than that of the precedence level of said received packet or dropping said received packet if all packets in said queue have a precedence level greater than that of said received packet;
   wherein said queue comprises at least one lower precedence queue and at least one higher precedence queue and dropping a packet having a precedence level less than that of the precedence level of said received packet comprises:

incrementing a counter at said lower precedence queue that indicates the number of transmit slots said lower precedence queue owes to said higher precedence queue; and incrementing a counter at said higher precedence queue that indicates the number of transmit slots owed by said lower precedence queue.

2. The method of claim 1 further comprising maintaining a doubly-linked list.

3. The method of claim 2 further comprising adding said received packet to the doubly-linked list if said queue threshold is not exceeded.

4. The method of claim 3 further comprising updating a per-precedence list to include said received packet.

5. The method of claim 1 wherein dropping a packet comprises dropping a packet upon arrival of said received packet.

6. The method of claim 1 wherein said queue comprises an arrival queue and a transmit queue.

7. The method of claim 6 further comprising incrementing an aggregate counter and a per-precedence counter upon receiving said packet.

8. The method of claim 6 further comprising incrementing a debt counter if a packet having a lower precedence level than said received packet is to be dropped.

9. The method of claim 8 further comprising transferring packets from said arrival queue to said transmit queue, and wherein dropping a packet comprises dropping said packet as it is transmitted from said arrival queue if the debt counter corresponding to the packet's precedence level is non-zero.

10. The method of claim 1 wherein said threshold corresponds to a length of a FIFO scoreboard.

11. The method of claim 10 wherein dropping said lower precedence packet further comprises:

dropping said lower precedence packet from said lower precedence queue; and overwriting an entry in said FIFO scoreboard corresponding to said lower precedence queue to point to a higher precedence queue containing said received packet.

12. The method of claim 1 wherein queuing said packet comprises adding said received packet to a corresponding precedence queue.

13. The method of claim 12 further comprising adding a transmit slot pointing to said corresponding precedence queue to said FIFO scoreboard.

14. The method of claim 1 wherein queuing said received packet comprises queuing said packet in a queue corresponding to the packet's precedence level and assigning a token for a next available transmit slot to said packet's precedence level queue.

15. The method of claim 1 wherein said queue comprises a plurality of queues, each of said queues corresponding to a precedence group and further comprising marking the queue from which said lower precedence packet is dropped.

16. The method of claim 1 further comprising dropping a packet from said queue if said threshold is exceeded and said received packet has a precedence level equal to that of the packet in said queue.

17. The method of claim 1 further comprising dropping said received packet if said threshold is exceeded and said received packet has a precedence level equal to that of a packet in said queue.

18. The method of claim 1 wherein said queue comprises a plurality of per-flow queues and further comprising maintaining a list of transmission slots owned by said per-flow queues.

19. The method of claim 18 wherein maintaining a list of slots further comprises utilizing a hierarchical bit mask.

20. The method of claim 18 wherein maintaining a list of slots further comprises utilizing FIFO or a linked list.

21. The method of claim 1 wherein dropping a packet comprises incrementing a drop counter corresponding to said lower precedence queue and dropping said packet when an event occurs for said lower precedence queue.

22. A computer-readable storage medium encoded with a computer program for providing delay bound and prioritized packet dropping, said computer program comprising:

code that causes a size of a queue configured to deliver packets in FIFO order to be limited by a threshold based on a specified delay bound;

code that causes a received packet having a precedence level to be queued if said threshold is not exceeded; and code that causes a packet having a precedence level less than that of the precedence level of said received packet to be dropped if said threshold is exceeded or said received packet to be dropped if all packets in said queue have a precedence level greater than that of said received packet and said threshold is exceeded;

wherein said queue comprising at least one lower precedence queue and at least one higher precedence queue and code that causes dropping a packet having a precedence level less than that of the precedence level of said received packet comprises:

code that causes incrementing a counter at said lower precedence queue that indicates the number of transmit slots said lower precedence queue owes to said higher precedence queue; and code that causes incrementing a counter at said higher precedence queue that indicates the number of transmit slots owed by said lower precedence queue.

23. The computer-readable storage medium of claim 22 further comprising code that causes a doubly-linked list to be maintained.

24. The computer-readable storage medium of claim 22 further comprising code that causes a per-precedence list to be updated to include said received packet.

25. The computer-readable storage medium of claim 22 wherein said queue comprises an arrival queue and a transmit queue and further comprising code that increments an aggregate counter upon receiving said packet.

26. The computer-readable storage medium of claim 25 wherein code that causes a packet to be dropped comprises code that causes said packet to be dropped as it is transmitted from said arrival queue if a debt counter corresponding to the packet's precedence level is non-zero.

27. The computer-readable storage medium of claim 22 wherein said threshold corresponds to a length of a FIFO scoreboard.

28. The computer-readable storage medium of claim 27 wherein code that causes a lower precedence packet to be dropped further comprises:

code that causes said lower precedence packet to be dropped from said lower precedence queue; and code that causes overwriting of an entry in said FIFO scoreboard corresponding to said lower precedence queue to point to a higher precedence queue containing said received packet.

29. Apparatus for providing delay bound and prioritized packet dropping, said apparatus comprising:

a processor;

a memory device that stores:

code that causes a size of a queue configured to deliver packets in FIFO order to be limited by a threshold based on a specified delay bound, said threshold corresponding to a length of a FIFO scoreboard;

code that causes a received packet having a precedence level to be queued if said threshold is not exceeded; and code that causes a packet having a precedence level less than that of the precedence level of said received packet to be dropped if said threshold is exceeded or said received packet to be dropped if all packets in said queue have a precedence level greater than that of said received packet if said threshold is exceeded;

wherein code that causes dropping a lower precedence packet comprises:

code that causes dropping a lower precedence packet from a lower precedence queue; and code that causes overwriting an entry in said FIFO scoreboard corresponding to said lower precedence queue to point to a higher precedence queue containing said received packet.

30. The apparatus of claim 29 wherein code for queuing said packet comprises code for adding said packet to a corresponding precedence queue.

31. The apparatus of claim 29 further comprising code that causes a doubly-linked list to be maintained.

32. Apparatus for providing delay bound and prioritized packet dropping, said apparatus comprising:

means for providing a queue configured to deliver packets in FIFO order;

means for limiting a size of said queue by a threshold based on a specified delay bound, said threshold corresponds to a length of a FIFO scoreboard;

means for receiving a packet having a precedence level;

means for queuing said received packet if said threshold is not exceeded; and if said threshold is exceeded, means for dropping a packet from said queue having a precedence level less than that of the precedence level of said received packet or means for dropping said received packet if all packets in said queue have a precedence level greater than that of said received packet;

wherein means for dropping a lower precedence packet comprises:

means for dropping a lower precedence packet from a lower precedence queue; and means for overwriting an entry in said FIFO scoreboard corresponding to said lower precedence queue to point to a higher precedence queue containing said received packet.

33. The apparatus of claim 32 wherein means for queuing said packet comprises adding said packet to a corresponding precedence queue.

* * * * *

UNITED STATES PATENT AND TRADEMARK OFFICE
CERTIFICATE OF CORRECTION

| | | |
|---|---|---|
| PATENT NO. | : 7,567,508 B2 | Page 1 of 1 |
| APPLICATION NO. | : 11/134898 | |
| DATED | : July 28, 2009 | |
| INVENTOR(S) | : Anna Charny et al. | |

It is certified that error appears in the above-identified patent and that said Letters Patent is hereby corrected as shown below:

On the Title page item (54) and col. 1, lines 1-3 should read:

METHOD AND SYSTEM FOR PROVIDING DELAY BOUND AND PRIORITIZED PACKET DROPPING

Signed and Sealed this
Fifth Day of April, 2011

David J. Kappos
*Director of the United States Patent and Trademark Office*